US007628848B2

(12) United States Patent
Saldarriaga

(10) Patent No.: US 7,628,848 B2
(45) Date of Patent: Dec. 8, 2009

(54) WATER-BASED COMPOSITION FOR RENEWING PLASTIC SURFACES

(75) Inventor: Rodrigo F. Saldarriaga, Medellin (CO)

(73) Assignee: Janus Enterprises, LLC, Miami, FL (US)

( * ) Notice: Subject to any disclaimer, the term of this patent is extended or adjusted under 35 U.S.C. 154(b) by 153 days.

(21) Appl. No.: 11/736,095

(22) Filed: Apr. 17, 2007

(65) Prior Publication Data

US 2007/0244260 A1 Oct. 18, 2007

(30) Foreign Application Priority Data

Apr. 17, 2006 (CO) ................................ 06-036200

(51) Int. Cl.

| | |
|---|---|
| ***C09G 1/00*** | (2006.01) |
| ***C09G 1/04*** | (2006.01) |
| ***C09G 1/14*** | (2006.01) |
| ***C14C 9/00*** | (2006.01) |
| ***C14C 11/00*** | (2006.01) |

(52) U.S. Cl. .......................... 106/3; 106/5; 106/287.26; 106/311; 252/8.57; 252/364

(58) Field of Classification Search ..................... 106/3, 106/287.26, 311, 5; 252/8.57, 364
See application file for complete search history.

(56) References Cited

U.S. PATENT DOCUMENTS

| | | | | |
|---|---|---|---|---|
| 6,162,850 | A * | 12/2000 | Boucher et al. | 524/405 |
| 6,338,875 | B1 * | 1/2002 | Boucher et al. | 427/372.2 |
| 6,372,201 | B1 * | 4/2002 | Leuridan et al. | 424/61 |
| 7,217,758 | B2 * | 5/2007 | Buckmann et al. | 524/501 |
| 7,307,110 | B2 * | 12/2007 | Yatake | 523/160 |
| 2007/0244260 | A1 * | 10/2007 | Saldarriaga | 525/231 |

FOREIGN PATENT DOCUMENTS

WO WO00/18826 A1 * 4/2000

* cited by examiner

*Primary Examiner*—Anthony J Green
(74) *Attorney, Agent, or Firm*—Dennison, Schultz & MacDonald

(57) ABSTRACT

A water-based, non-oily, scented, liquid composition, with an ultraviolet filter, to be applied manually by brush or sponge, or by using an air gun, to surfaces of a synthetic nature. When impregnated, such surfaces recover their shine to an extent according to the number of layers applied, and are renewed in appearance.

9 Claims, No Drawings

WATER-BASED COMPOSITION FOR RENEWING PLASTIC SURFACES

BACKGROUND OF THE INVENTION

The invention is directed to a water-based, non-oily, scented, liquid composition, with an ultraviolet filter, to be applied manually or using an air gun or a sponge which, when impregnated on a surface of a synthetic nature, enables the surface to recover its shine according to the number of layers applied and renews possible deteriorations in the surface.

This product is especially applicable to automobiles, and to vehicles in general (land, air or water), to polish and renew their plastic parts, and further and its use may be extended to other coating applications, such as water-based nail polish, horse-hoof, furniture, wood, leather and plastic polish in general, of any color and texture.

SUMMARY OF THE INVENTION

The composition of the invention comprises a number of active principles based on components of dipropylene glycol n-butyl ether, propylene glycol n-butyl ether, styrene acrylic copolymer emulsion and water, together with a gum-based aromatic agent, fixator for the aromatic agent, preservative, and UV filter.

DETAILED DESCRIPTION OF THE INVENTION

The composition of the invention is a homogenized mixture of a styrene acrylic copolymer emulsion, a standard product used for coating metals and in adhesives. This emulsion is used in a mixture with water, and with lesser amounts of dipropylene glycol n-butyl ether and proplyene glycol n-butyl ether.

The composition also preferably contains a UV filter, a fruit aromatic agent (gum), a fixator for the aromatic agent and a preservative.

The stryene acrylic copolymer dispersion is a common coating material sold by a number of companies. It is typically present in the composition in an amount of 25-50% wt. %, preferably 30-40 wt. %.

The dipropylene glycol n-butyl ether is sold under the trade name Acrosolv® DpnB (Lyondell Chemical Company), and is present is an amount of 0.5-3 wt. %, preferably about 2 wt. %. The propylene glycol n-butyl ether is sold under the trade name Acrosolv® PnB, (Lyondell Chemical Company), and is typically present in an amount of 0.1-1 wt. %, preferably about 0.5 wt. %.

The UV filter is preferably benzophenone-3, such as Eusolex® 4360, sold by Merck KgaA. Other similar UV filters for coatings may also be used. It is present in an amount of about 0.05-0.5 wt. %, preferably about 0.1 wt. %.

The preservative is typically sodium methyl p-hydroxybenzoate, also known as sodium methylparaben. It is typically present in an amount of about 0.5-2 wt. %, preferably about 1 wt. %. Other preservatives may also be used.

The fragrance is preferably "fruit gum," a mixture of artificial aromatic substances, propylene glycol and preservative. Fragrance is usually present in an amount of about 0.5-5 wt. %, preferably about 2 wt. %. A "fixator" is usually present with the fragrance for maintaining the fragrance in the composition. The fixator is generally an aqueous solution of ethyl alcohol, and is present in an amount of about 0.1-1 wt. %.

Water, preferably deionized, is typically present in an amount of at least 50% by weight of the composition.

A typical composition of the invention, with the characteristics described herein and for application to plastics, leathers, vinyls and synthetic materials will typically contain, by weight, about 2% dipropylene glycol n-butyl ether, about 0.5% propylene glycol n-butyl ether, about 35% styrene acrylic copolymer dispersion, and the remainder water.

More preferably, the composition will include the UV filter, fragrance, fixator and preservative, and will contain, by weight:

| | | |
|---|---|---|
| a. | dipropylene glycol n-butyl ether | 2% |
| b. | propylene glycol n-butyl ether | 0.5% |
| c. | acrylic copolymer emulsion | 34% |
| d. | fruit aromatic agent (gum) | 2% |
| e. | preservative | 1% |
| f. | fixator | 0.5% |
| g. | ultraviolet filter | 0.10% |
| h. | deionized water | 59.9% |

This composition is in the form of an emulsion (oil in water) prepared using the following sequence of steps:

1. Weigh and place in a stainless steel container or covered drum the foregoing components a, b, e and h in the following order:

(h+e+a+b)

and mixing together and homogenizing the components for 15 minutes at 1700 rpm.

2. Reduce the mixing speed to 800 rpm and slowly add component c into the vortex of the mixture in the container, stirring and homogenizing for 15 minutes.

3. Increase the mixing speed to 1700 rpm, and add components (d+f+g) to the mixture from step 2, homogenizing at 1700 rpm for 10 minutes.

4. Age the final mixture for two days, at the end of which time samples are taken for the relevant quality control.

The product of the invention is a quick-drying transparent lacquer, with excellent adherence to plastic surfaces needing renewal, on plastic substrates such as polypropylene, acrylic styrene, butadiene, polycarbonate and a flexible PVC mixture.

The composition of the invention described above has the following technical specifications:

| | |
|---|---|
| VOC Volume | 43.07 gallons/liter |
| Density | 3.81 to 3.91 kilograms/gallon |
| Viscosity (Ford cup at 25 degrees) | 9 to 12 seconds |
| Solids by weight | 24.65 ± 2 (%) |
| Weight per gallon at 25° C. | 3.85 kilograms |
| Theoretical yield at 25 μm of dry film | 33.83 $m^2$/gallon |
| Drying on contact | 1 to 3 minutes |
| Drying on handling | 7 to 10 minutes |
| Stable storage at 25° C. | 6 months under cover |
| Film thickness | 12.5 to 25.4 μm |
| Flash point | 100° C. |

In order to apply this composition on plastic surfaces, the composition must be homogenized by stirring for approximately 10 minutes, and subsequently applied uniformly and without dilution on the surface, in layers of no more than about 25 μm; if this thickness is exceeded, adherence to certain plastics will be affected. The composition is then left to dry for up to 10 minutes. The composition may be applied manually using a brush or sponge, or with an air gun.

The composition of the invention must be handled with certain precautions to be kept in mind, such as avoiding contact with inorganic solvents, fire, exposure to high temperatures and freezing.

Its decomposition may produce carbon monoxide and acrylic acid vapors which are harmful to health, and must therefore be handled avoiding ingestion or inhalation thereof and inasmuch as possible, any eye or skin contact.

What is claimed is:

1. Water-based liquid composition used to restore and polish plastic surfaces, leathers and synthetic materials, comprising a homogenized mixture containing, by weight, about 0.5-3% dipropylene glycol n-butyl ether, about 0.1-1% propylene glycol n-butyl ether, about 25-50% styrene acrylic copolymer emulsion and the remainder water.

2. A composition according to claim 1, wherein the styrene acrylic copolymer is present in an amount of about 30-40% by weight.

3. A composition according to claim 1, additionally comprising at least one further agent selected from the group consisting of a UV filter, a preservative, and a fragrance.

4. A composition according to claim 1, additionally comprising a fragrance and a fixator therefor.

5. A water-based liquid composition used to restore and polish plastic surfaces, leathers and synthetic materials, comprising a homogenized mixture containing, in % by weight, about:

| | |
|---|---|
| dipropylene glycol n-butyl ether | 2% |
| propylene glycol n-butyl ether | 0.5% |
| styrene acrylic copolymer emulsion | 34% |
| fragrance | 2% |
| preservative | 1% |
| fixator | 0.5% |
| ultraviolet filter | 0.10% |
| water | 59.9% |

6. A composition according to claim 5, wherein the fragrance is fruit aromatic agent (gum).

7. A composition according to claim 5, wherein the preservative is sodium methylparaben.

8. A composition according to claim 5, wherein the UV filter is benzophenone-3.

9. A composition according to claim 5, obtained by the steps of:

homogenizing the water, preservative, dipropylene glycol n-butyl ether and propylene glycol n-butyl ether for about 15 minutes at a stirring speed of about 1700 rpm to form a first mixture;

reducing the stirring speed to about 800 rpm, adding to said first mixture the styrene acrylic copolymer emulsion, and homogenizing at about 800 rpm for 15 minutes to form a second mixture;

increasing the stirring speed to about 1700 rpm and adding to the second mixture, the fragrance, the fixator and the UV filter, and homogenizing for about 10 minutes at about 1700 rpm to form a final mixture; and permitting the final mixture to age for at least about two days.

* * * * *